(12) United States Patent
Romero et al.

(10) Patent No.: US 6,822,459 B1
(45) Date of Patent: Nov. 23, 2004

(54) TESTING IMPLEMENTATION FOR SIGNAL CHARACTERIZATION

(75) Inventors: Gabriel L. Romero, Colorado Springs, CO (US); William J. Schmitz, Monument, CO (US); Erik Paulsen, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/882,786

(22) Filed: Jun. 15, 2001

(51) Int. Cl.⁷ ............................................. H01M 31/02
(52) U.S. Cl. ..................................... 324/539; 439/502
(58) Field of Search ............................ 324/538, 539, 324/540, 529, 527, 620, 537, 579; 174/27, 113 R, 177 FF; 439/502; 326/80; 375/257; 702/117

(56) References Cited

U.S. PATENT DOCUMENTS

| | | | | |
|---|---|---|---|---|
| 3,336,434 A | * | 8/1967 | Crimmins ................ | 174/72 R |
| 3,571,752 A | * | 3/1971 | Sturm, Jr. ................ | 324/529 |
| 4,941,115 A | * | 7/1990 | Nihart .................... | 702/117 |
| 5,149,277 A | * | 9/1992 | LeMaster ................ | 439/207 |
| 5,299,306 A | * | 3/1994 | Asprey .................... | 375/257 |
| 5,414,343 A | * | 5/1995 | Flaherty et al. ........... | 324/66 |
| 5,926,031 A | * | 7/1999 | Wallace et al. ........... | 326/30 |
| 6,259,256 B1 | * | 7/2001 | Walling .................. | 324/539 |
| 6,341,358 B1 | * | 1/2002 | Bagg et al. .............. | 714/43 |
| 6,352,447 B1 | * | 3/2002 | Ruth ..................... | 439/540.1 |
| 6,483,033 B1 | * | 11/2002 | Simoes et al. ........... | 174/72 A |
| 6,496,014 B1 | * | 12/2002 | Cook ..................... | 324/539 |
| 6,503,098 B2 | * | 1/2003 | Aoki et al. .............. | 439/502 |
| 6,512,378 B2 | * | 1/2003 | Fernandez ............... | 324/539 |

* cited by examiner

*Primary Examiner*—Anjan Deb
*Assistant Examiner*—Walter Benson
(74) *Attorney, Agent, or Firm*—Maginot, Moore & Beck LLP

(57) ABSTRACT

A signal testing implementation provides significant advantages over conventional signal testing techniques. According to an exemplary embodiment, an apparatus for enabling signal testing such as SCSI signal testing in a test configuration includes a portable cable environment having a plurality of cables exhibiting a plurality of lengths and impedances. A user can selectively connect any one of the cables between a host device such as a server and a target device such as a disk subsystem. Signal measurement connectors which are connectable to the portable cable environment may be provided. According to an embodiment, each of the signal measurement connectors includes one or more test measurement points to enable collection of signal testing results.

15 Claims, 4 Drawing Sheets

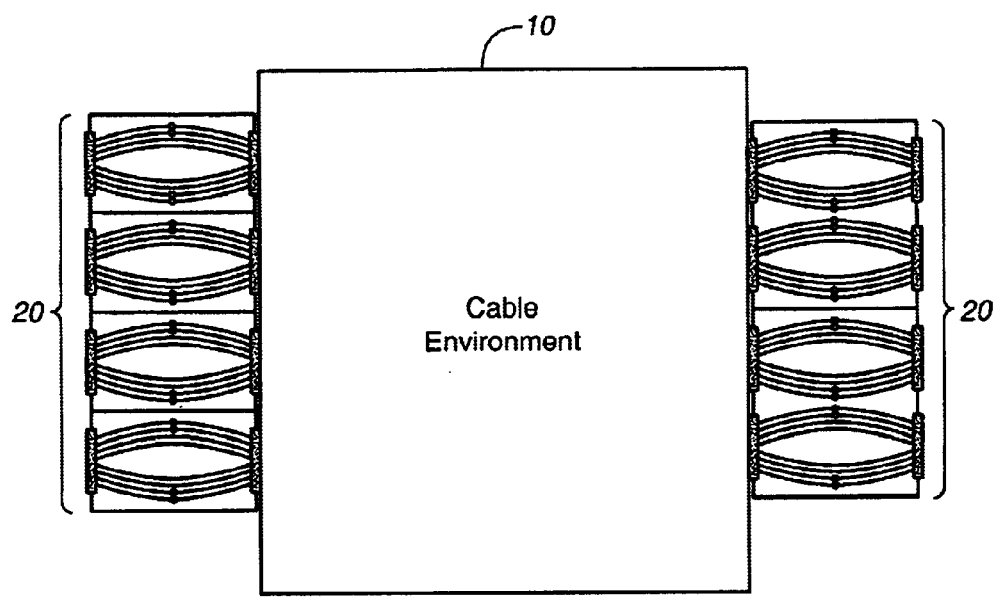
FIG._1
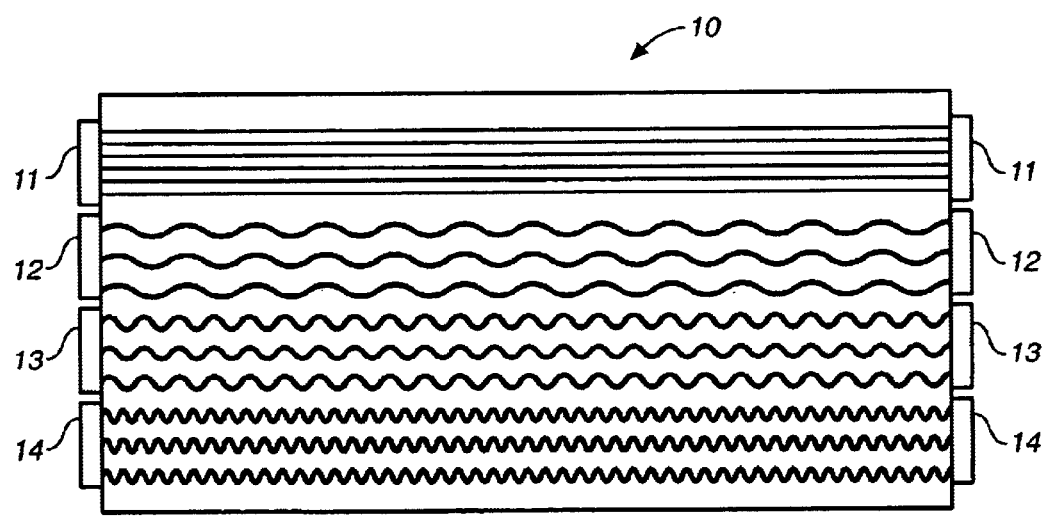
FIG._2

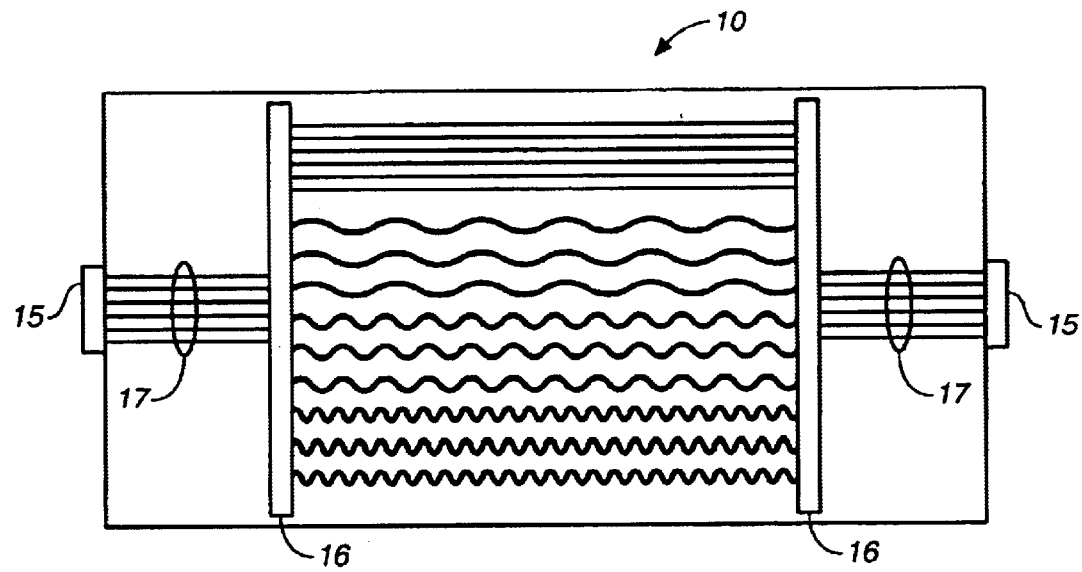
FIG._3
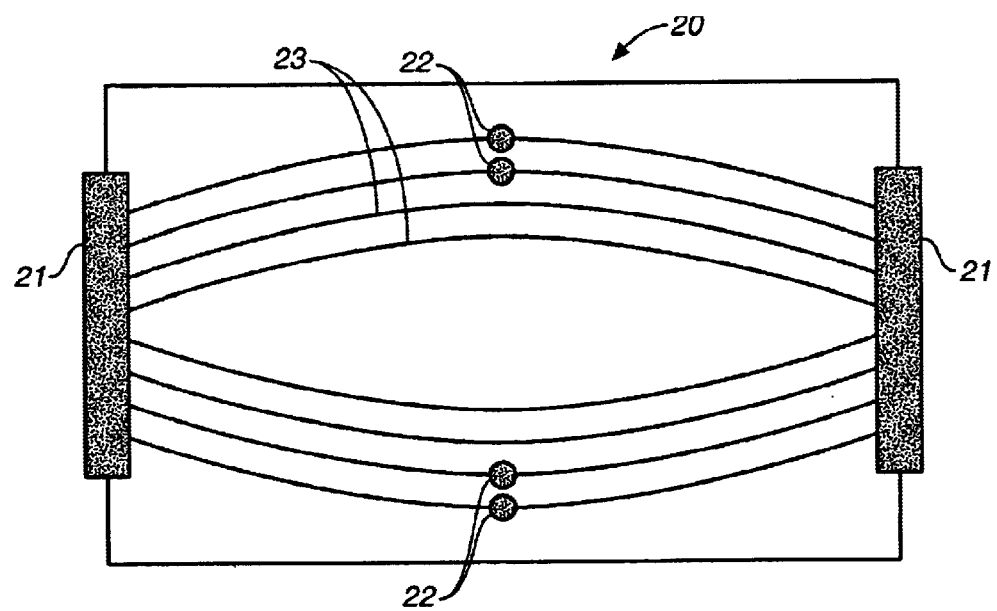
FIG._4

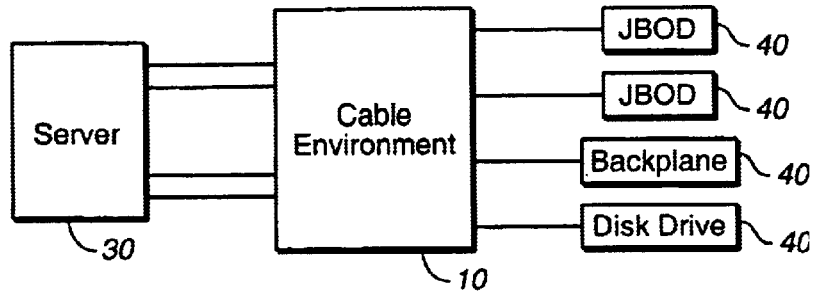
FIG._5
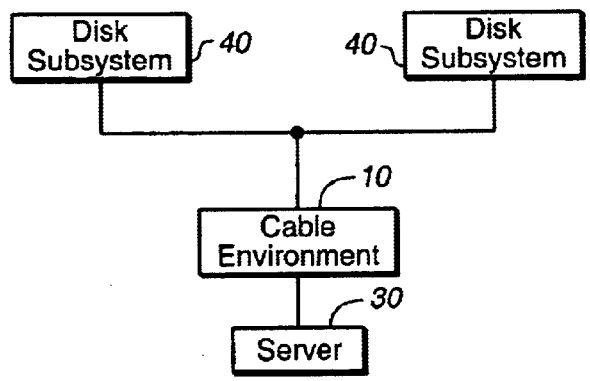
FIG._6
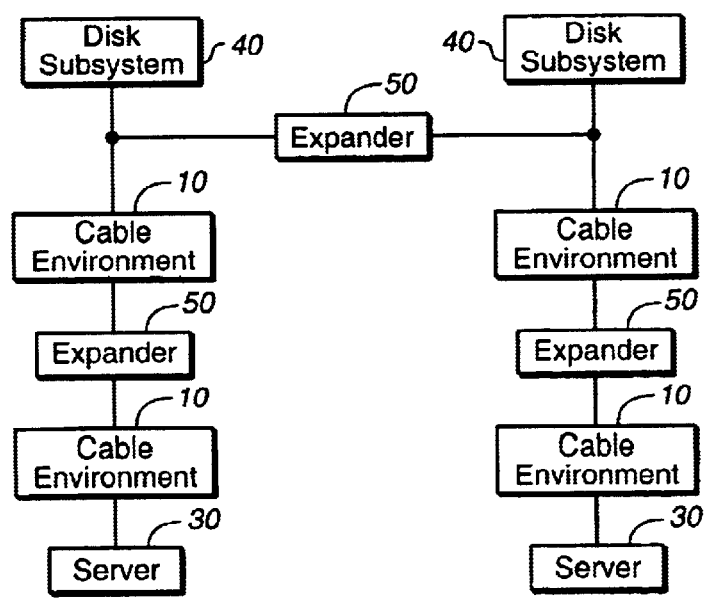
FIG._7

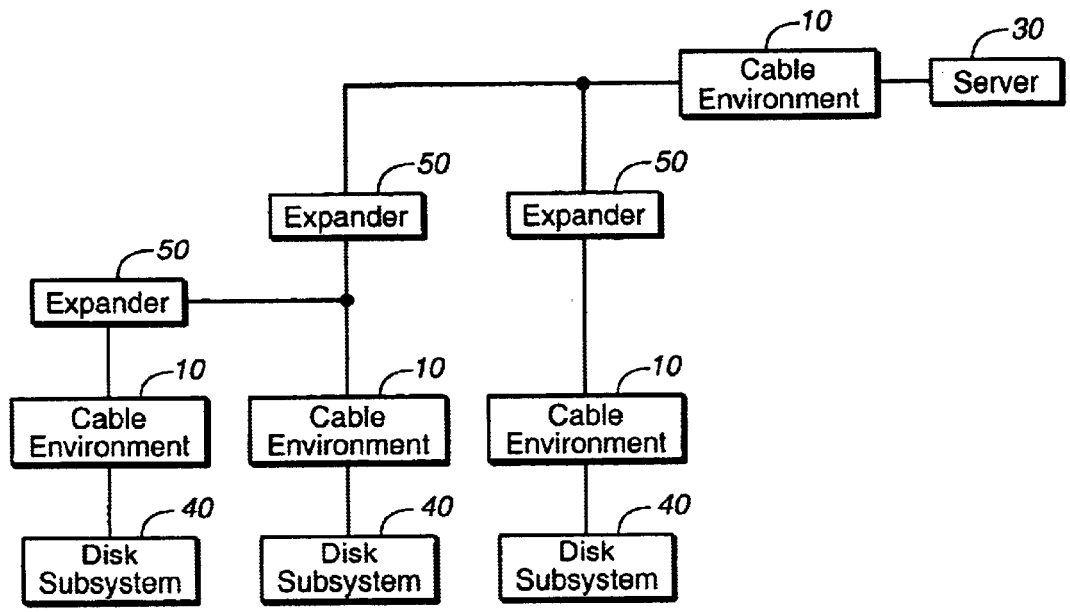
FIG._8
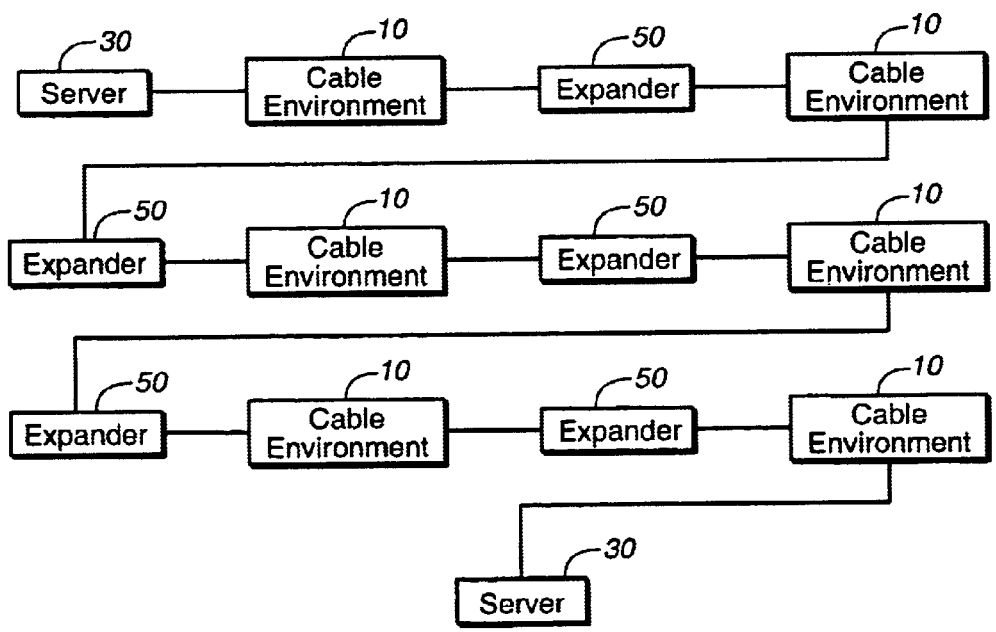
FIG._9

TESTING IMPLEMENTATION FOR SIGNAL CHARACTERIZATION

BACKGROUND OF THE INVENTION

1. Field of the Invention

The present invention relates generally to the testing of electrical signals, and more particularly, to an improved implementation for enabling testing of signals, such as small computer system interface (SCSI) signals, under various conditions.

2. Description of the Related Art

At present, various types of personal computer systems are in wide use. Such systems may be designed to incorporate hard disk drives (HDDs) and one or more input/output (I/O) devices, such as printers, scanners and the like. These devices are typically capable of external connectivity via a port connector. One of the common interfaces employed to connect I/O devices to a computer system is the small computer system interface (SCSI), for which standards have been established by the American National Standards Institute (ANSI). Since currently there are various SCSI file type devices such as HDDs, CD-ROMs, and magneto-optic (MO) discs, the SCSI is considered the standard in this field. A device that has an interface conforming to the SCSI is called a SCSI device, and a bus that can be connected to a SCSI interface is called a SCSI bus. Electrical signals transmitted in environments having SCSI devices and buses may be referred to as SCSI signals.

In environments employing electrical devices such as SCSI devices, it is important to understand signal characteristics in the environment. For example, it is important to have knowledge of certain electrical parameters such as signal amplitude, intersymbol interference, slew rates and/or signal skew. Knowledge of these parameters may assist in tasks such as product design and systems engineering. For example, knowledge of these parameters may assist in understanding how certain devices that communicate using SCSI signals such as servers, signal expanders and/or other devices operate under various conditions, and/or whether such devices comply with various standardized signal transfer protocols. This knowledge may also be used to determine what types of cables and/or devices are suitable for implementation in given environments and/or configurations. Accordingly, there is a need to perform signal testing with various types of signals such as SCSI signals.

To ensure wider test coverage, such testing should preferably be conducted under various conditions using several different testing configurations. Current signal testing techniques tend to be rather slow and laborious. In particular, separate tests must be run for each testing configuration and test cables must be manually located and changed for each test. This requires a user to engage in the time-consuming process of locating the necessary cables, and connecting the cables to the various devices in the testing configuration. Repeating this process for each testing configuration is especially burdensome. Accordingly, there is a need for a signal testing implementation which is faster, easily repeatable and enables wider test coverage. The present invention has been contemplated to address these and other problems.

SUMMARY OF THE INVENTION

The present invention provides a signal testing implementation which enables significant advantages over conventional signal testing techniques. According to an exemplary embodiment, an apparatus for enabling signal testing such as SCSI signal testing in a test configuration provides a cable environment embodied as a portable housing structure including a plurality of cables exhibiting a plurality of lengths and impedances. At least a portion of each of the cables is supported within the portable housing structure. A user can selectively connect any one of the cables between a host device such as a server and a target device such as a disk subsystem. According to an embodiment, a user can select a particular cable for connection between the host device and the target device through input to a switch. Signal measurement connectors which are connectable to the portable cable environment may be provided. Each of the signal measurement connectors includes one or more test measurement points to enable collection of signal testing results. In use, the portable cable environment can be moved to a location corresponding to a given test configuration. A user can then selectively connect any one of the cables of the portable cable environment between the host device and the target device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a schematic diagram of a cable environment with signal measurement connectors constructed according to principles of the present invention;

FIG. 2 is a schematic diagram providing details of a first embodiment of a cable environment constructed according to principles of the present invention;

FIG. 3 is a schematic diagram providing details of a second embodiment of a cable environment constructed according to principles of the present invention;

FIG. 4 is a schematic diagram providing details of a signal measurement connector constructed according to principles of the present invention;

FIG. 5 is a schematic diagram of a first exemplary configuration suitable for performing signal testing using a cable environment constructed according to principles of the present invention;

FIG. 6 is a schematic diagram of a second exemplary configuration suitable for performing signal testing using a cable environment constructed according to principles of the present invention;

FIG. 7 is a schematic diagram of a third exemplary configuration suitable for performing signal testing using a cable environment constructed according to principles of the present invention;

FIG. 8 is a schematic diagram of a fourth exemplary configuration suitable for performing signal testing using a cable environment constructed according to principles of the present invention; and FIG. 9 is a schematic diagram of a fifth exemplary configuration suitable for performing signal testing using a cable environment constructed according to principles of the present invention.

The exemplifications set out herein illustrate preferred embodiments of the invention, and such exemplifications are not to be construed as limiting the scope of the invention in any manner.

DETAILED DESCRIPTION OF THE INVENTION

Referring now to the drawings and, more particularly to FIG. 1, a schematic diagram of a cable environment with signal measurement connectors constructed according to principles of the present invention is shown. In FIG. 1, a cable environment 10 is constructed as a portable housing structure containing a plurality of different cables. The cable environment 10 may include a handle, wheels and/or other means (not shown in FIG. 1) by which a user may quickly and efficiently move the cable environment 10 between different signal testing locations. According to an exemplary embodiment, each of the cables included in the cable environment 10 is a different type. For example, it is contemplated that one or more of the following types of cables may be used: twisted pair round cable, flat ribbon cable, and flat ribbon twisted pair cable. Other types of cables may also be used in accordance with principles of the present invention. Moreover, the cable environment 10 may be constructed to include one or more backplanes. It may also be preferable to include cables from different cable manufacturers, such as Hitachi, Madison, Tempflex and/or other manufacturers. It may also be preferable to include cables of different lengths. For example, it is contemplated that cable lengths of 1 meter, 12 meters, 25 meters and/or other lengths may be utilized. It may also be preferable to include cables of different impedances. For example, it is contemplated that low voltage differential (LVD) impedances in the range of 110 ohms to 135 ohms may be used. However, other impedance values may also be used. Accordingly, to ensure a wide test coverage, the cable environment 10 may include cables of various types, lengths, manufacturers and impedances. The number of such variations for the cable environment 10 is countless, with each one being within the inventive scope of the present invention. The specific parameter variations selected for a given embodiment of the present invention are simply a matter of design choice.

One or more signal measurement connectors 20 may be connected to both ends of the cable environment 10. Each of the signal measurement connectors 20 connects to a cable connector (not shown in FIG. 1) of the cable environment 10 to facilitate a signal testing process. In particular, each of the signal measurement connectors 20 provides one or more dedicated test measurement points to which a signal testing device such as an oscilloscope may be connected. In the exemplary embodiment of FIG. 1, there are four signal measurement connectors 20 coupled to each end of the cable environment 10. However, any number of signal measurement connectors could be utilized in accordance with principles of the present invention. Further details regarding the signal measurement connectors 20 will be provided later herein.

Referring now to FIG. 2, a schematic diagram providing details of a first embodiment of a cable environment 10 constructed according to principles of the present invention is shown. In particular, FIG. 2 shows an embodiment where the cable lengths and impedances are selected by a user physically connecting a corresponding cable between a host device and a target device. As will be discussed later herein, the present invention also includes an embodiment for the cable environment 10 where a user may select a given cable length and/or impedance through an input to a mechanism such as a switch. In FIG. 2, the cable environment 10 includes four cables, wherein at least a portion of each cable is fixedly supported within the housing of the cable environment 10. Each of the cables exhibits a specific, fixed length and impedance. Again, the specific lengths and impedances used in practice are simply a matter of design choice. Also, it should be intuitive that any number of such cables may be used according to principles of the present invention. Each of the four cables in FIG. 2 includes a pair of cable connectors designated by reference numerals 11, 12, 13 and 14, respectively. According to a preferred embodiment, each of the cable connectors 11 to 14 connects to a signal measurement connector 20, as indicated in FIG. 1.

Referring now FIG. 3, a schematic diagram providing details of a second embodiment of a cable environment 10 constructed according to principles of the present invention is shown. In particular, FIG. 3 shows an embodiment where the cable lengths and impedances are selectable through user inputs to a mechanism such as a switch. In FIG. 3, a pair of cable connectors 15 is provided for connection to corresponding signal measurement connectors 20 in the manner indicated in FIG. 1. It should be intuitive that any number of such cable connectors 15 may be provided in accordance with principles of the present invention. The cable environment 10 of FIG. 3 also includes four cables wherein at least a portion of each of the cables is embodied within the housing of the cable environment 10. Each of the cables has a different length and/or impedance. Any number of such cables may be included in accordance with principles of the present invention. Relays 16 are connected to the cables and operate as switches, thereby enabling a user to select any one of the cables. The relays 16 may be embodied on a PC board or card which connects to the individual cables. Link connectors 17 are provided for electrically connecting the relays 16 to the cable connectors 15. The relays 16 may be controlled in a variety of ways such as by one or more external switches, or through software using a parallel port. In this manner, the user may conveniently select a cable having a desired length and/or impedance.

According to an alternative embodiment, a cable environment 10 providing variable cables lengths and/or impedances may be achieved using a custom backplane containing a plurality of switches. In this embodiment, the switches enable a user to select different path lengths and/or impedances. The backplane switches may be controlled by a plurality of external switches or by software using a parallel port. This embodiment also enables a user to conveniently select a cable having a desired length and/or impedance. However, since the characteristics of a backplane are different from that of a physical cable, this embodiment requires signal characterization on several cable and backplane designs. Also, the switches utilized in this embodiment should be selected so as not to create an excessive impedance mismatch, or regenerate an original test signal. The more switching capability provided to the user may create reflection problems due to multiple connections. Accordingly, these design issues should be taken into consideration when implementing this alternative embodiment.

Referring now to FIG. 4, a schematic diagram providing details of a signal measurement connector 20 constructed according to principles of the present invention is shown. As indicated in FIG. 4, a signal measurement connector 20 may be embodied as a dedicated circuit card or the like. The signal measurement connector 20 includes a pair of connectors 21, such as connectors enabling connections between a SCSI device and bus. One of the connectors 21 is typically connected to a cable connector such as a cable connector 11, 12, 13, 14 or 15 shown in FIGS. 2 and 3. The signal measurement connector 20 also includes one or more test points 22 to which a signal testing device such as an oscilloscope may be connected to perform signal testing. These test points 22 may be embodied as electrically conductive pads, pins or the like to enable connection to a signal testing device. Reference number 23 refers to a pair of equal length differential conductors included on the signal measurement connector 20.

Application of a cable environment 10 constructed according to principles of the present invention will now be described in relation to several preferred signal testing configurations. For purposes of explanation and simplicity, these configurations illustrate the cable environment 10 without accompanying signal measurement connectors 20. Although not expressly shown, it should be understood that such signal measurement connectors 20 are included in the following configurations in a manner such as that illustrated in FIG. 1 to facilitate the input and output of signals to and from the cable environments 10 and the collection of signal testing data.

The following testing configurations may be assembled by one or more users and utilized in accordance with principles of the present invention to provide valuable data that may assist in tasks such as product design and systems engineering. As previously indicated, knowledge of certain electrical parameters in these configurations may assist in understanding how certain devices that communicate using SCSI signals such as servers, signal expanders and/or other devices operate under various conditions, and/or whether such devices comply with various standardized signal transfer protocols. Moreover, knowledge of such electrical parameters may also be used to determine what types of cables and/or devices are suitable for implementation in given environments and/or configurations.

Referring now to FIG. 5, a schematic diagram of a first exemplary configuration suitable for performing signal testing using a cable environment constructed according to principles of the present invention is shown. In FIG. 5, a host server 30 executes test code such as WINTHRAX™ brand software available from LSI Logic to generate signal traffic over four cables (i.e., bus lines) provided by the cable environment 10. As previously indicated, the cable parameters selected for use are simply a matter of design choice. The cable environment 10 of the present invention advantageously provides a means by which users may quickly and conveniently select and connect different cables having different characteristics. In this manner, the present invention provides a signal testing implementation which is faster, easily repeatable and enables wider test coverage.

According to a preferred embodiment, the server 30 may include two dual channel SCSI controllers placed in two peripheral component interconnect (PCI) slots. A disk subsystem 40 serves as a target on the four bus lines provided by the cable environment 10. For purposes of example and explanation, the disk subsystem 40 of FIG. 5 is shown to include components such as "just a bunch of disks" (JBODs), a backplane and a disk drive. These components are commonly used to perform signal testing such as SCSI signal testing. Hereinafter, the term disk subsystem 40 is used in the various testing configurations to generically represent one or more of the foregoing target components shown in FIG. 5. That is, throughout this disclosure, the term disk subsystem 40 may refer to an arrangement that includes one or more components such as JBODs, backplanes and/or disk drives.

According to a preferred embodiment, the test code executed by the host server 30 of FIG. 5 generates test signals such as low voltage differential (LVD) SCSI signals at various rates. During this process, the signal measurement connectors 20 (not shown in FIG. 5) at both ends of the cable environment 10 are monitored to collect signal testing results. For example, parameters such as signal amplitude, intersymbol interference, slew rates and/or signal skew may be recorded. In the configuration of FIG. 5, cable lengths of 1 meter and 12 meters have been used between the host server 30 and the JBODs. Moreover, a cable length of 12 meters has been used between the host server 30 and the backplane, and a cable length of 25 meters has been used between the host server 30 and the disk drive. Again, these lengths are merely exemplary and other lengths may be used in accordance with principles of the present invention.

Referring now to FIG. 6, a schematic diagram of a second exemplary configuration suitable for performing signal testing using a cable environment constructed according to principles of the present invention is shown. The configuration of FIG. 6 may be referred to as a Y-configuration. In FIG. 6, a host server 30 is connected to two disk subsystems 40 via a cable environment 10 constructed according to principles of the present invention. The cable environment 10 includes a known signal splitter to provide a signal path to and from both of the target disk subsystems 40. According to a preferred embodiment, test code such as LSI Logic's Winthrax is executed by the host server 30 of FIG. 6 to generate test signals such as low voltage differential (LVD) SCSI signals at various rates. During this process, the signal measurement connectors 20 (not shown in FIG. 6) at both ends of the cable environment 10 are monitored to collect signal testing results. For example, parameters such as signal amplitude, intersymbol interference, slew rates and/or signal skew may be recorded. The Y-configuration tends to be a very noisy environment for signal testing due to issues such as signal reflection. As will be seen hereinafter, the Y-configuration may be a component of other testing configurations.

Referring now to FIG. 7, a schematic diagram of a third exemplary configuration suitable for performing signal testing using a cable environment constructed according to principles of the present invention is shown. The configuration of FIG. 7 may be referred to as a duster configuration. In FIG. 7, two host servers 30 execute test code such as LSI Logic's Winthrax to generate signal traffic within the testing configuration. That is, each of the two servers 30 generates test signals such as low voltage differential (LVD) SCSI signals at various rates. The configuration of FIG. 7 includes four cable environments 10 constructed according to principles of the present invention. Two signal expanders 50 such as LSI Logic's LSA 53C320s are interposed between the cable environments 10, while a third signal expander 50 of the same or similar type operates as a bridge between the two signal paths. Two disk subsystems 40 are also provided as targets.

During the signal testing process, the signal measurement connectors 20 (not shown in FIG. 7) at both ends of each of the cable environments 10 may be monitored to collect signal testing results. For example, parameters such as signal amplitude, intersymbol interference, slew rates and/or signal skew may be recorded. As previously indicated, the cable parameters selected for use are simply a matter of design choice. The cable environments 10 of the present invention advantageously provide a means by which users may quickly and conveniently select and connect different cables having different characteristics. In this manner, the present invention provides a signal testing implementation which is faster, easily repeatable and enables wider test coverage.

Referring now to FIG. 8, a schematic diagram of a fourth exemplary configuration suitable for performing signal testing using a cable environment constructed according to principles of the present invention is shown. The configuration of FIG. 8 may be referred to as a compatibility configuration. In FIG. 8, a host server 30 executes test code such as LSI Logic's Winthrax to generate signal traffic within the testing configuration. That is, the host server 30 generates test signals such as low voltage differential (LVD) SCSI signals at various rates. The configuration of FIG. 8 includes four cable environments 10 constructed according to principles of the present invention. Three signal expanders 50, preferably of different types such as LSI Logic's LSA 53C320, LSA 53C180 and LSA 53C120, are provided as indicated in FIG. 8. Three disk subsystems 40 are also provided as targets.

During the signal testing process, the signal measurement connectors 20 (not shown in FIG. 8) at both ends of each of the cable environments 10 may be monitored to collect signal testing results. For example, parameters such as signal amplitude, intersymbol interference, slew rates and/or signal skew may be recorded. As previously indicated, the cable parameters selected for use are simply a matter of design choice. The cable environments 10 of the present invention advantageously provide a means by which users may quickly and conveniently select and connect different cables having different characteristics. In this manner, the present invention provides a signal testing implementation which is faster, easily repeatable and enables wider test coverage.

Referring now to FIG. 9, a schematic diagram of a fifth exemplary configuration suitable for performing signal testing using a cable environment constructed according to principles of the present invention is shown. The configuration of FIG. 9 may be referred to as a cascaded configuration. In FIG. 9, two servers 30 execute test code such as LSI Logic's Winthrax to generate signal traffic within the testing configuration. That is, each of the two servers 30 generates test signals such as low voltage differential (LVD) SCSI signals at various rates. The configuration of FIG. 9 includes six cable environments 10 constructed according to principles of the present invention. Five signal expanders 50 such as LSI Logic's LSA 53C320s are interposed between the cable environments 10.

During the signal testing process, the signal measurement connectors 20 (not shown in FIG. 9) at both ends of each of the cable environments 10 may be monitored to collect signal testing results. For example, parameters such as signal amplitude, intersymbol interference, slew rates and/or signal skew may be recorded. As previously indicated, the cable parameters selected for use are simply a matter of design choice. However, with the cascaded configuration of FIG. 9, it may be preferable to utilize cable lengths from 20 to 25 meters. This allows a testing process wherein signal degradation conditions may be readily monitored. The cable environments 10 of the present invention advantageously provide a means by which users may quickly and conveniently select and connect different cables having different characteristics. In this manner, the present invention provides a signal testing implementation which is faster, easily repeatable and enables wider test coverage.

While this invention has been described as having a preferred design, the present invention can be further modified within the spirit and scope of this disclosure. This application is therefore intended to cover any variations, uses, of adaptations of the invention using its general principles. For example, it is contemplated that the present invention may be applicable to testing electrical signals other than SCSI signals, and that signal testing according to the principles of the present invention may be performed using configurations other than those expressly disclosed herein. Further, this application is intended to cover such departures from the present disclosure as come within known or customary practice in the art to which this invention pertains and which fall within the limits of the appended claims.

What is claimed is:

1. An apparatus for enabling signal testing in a test configuration, comprising:
a cable environment embodied as a portable housing structure including a plurality of cables exhibiting a plurality of lengths and impedances, wherein at least a portion of each of the cables is supported within the portable housing structure and a user can selectively connect any one of the cables between a host device and a target device.

2. The apparatus of claim 1, further comprising at least one signal measurement connector which is connectable to the cable environment, the at least one signal measurement connector including one or more test measurement points to enable collection of signal testing results.

3. The apparatus of claim 1, wherein the host device is a server.

4. The apparatus of claim 1, wherein the target device is a disk subsystem.

5. The apparatus of claim 1, wherein the cable environment includes a switch enabling the user to select a cable of a particular length and impedance.

6. The apparatus of claim 1, wherein the signal testing is SCSI signal testing.

7. The apparatus of claim 1, wherein the test configuration is a Y-configuration.

8. A method for enabling signal testing in a test configuration, comprising steps of:
moving a cable environment to a location corresponding to the test configuration, wherein the cable environment is embodied as a portable housing structure including a plurality of cables exhibiting a plurality of lengths and impedances; and
selectively connecting any one of the cables of the cable environment between a host device and a target device.

9. The method of claim 8, further comprising a step of collecting signal testing results by monitoring a signal measurement connector connected to the cable environment.

10. The method of claim 8, wherein the host device is a server.

11. The method of claim 8, wherein the target device is a disk subsystem.

12. The method of claim 8, wherein a user selects a particular cable of the cable environment for connection between the host device and the target device by input to a switch.

13. The method of claim 8, wherein the signal testing is SCSI signal testing.

14. The method of claim 8, wherein the test configuration is a Y-configuration.

15. The method of claim 8 wherein the selectively connecting step further comprises employing a switch to selectively connect any one of the cables of the cable environment between a host device and a target device.

* * * * *